(12) United States Patent
Hara et al.

(10) Patent No.: US 7,188,668 B2
(45) Date of Patent: Mar. 13, 2007

(54) VEHICLE AIR-CONDITIONER (75) Inventors: Junichiro Hara, Ashikaga (JP);
Yoshinobu Iizuka, Tochigi (JP)

(73) Assignee: Calsonic Kansei Corporation (JP)

( * ) Notice: Subject to any disclaimer, the term of this patent is extended or adjusted under 35 U.S.C. 154(b) by 488 days.

(21) Appl. No.: 10/825,990

(22) Filed: Apr. 16, 2004

(65) Prior Publication Data

US 2004/0261989 A1 Dec. 30, 2004

(30) Foreign Application Priority Data

Apr. 18, 2003 (JP) ............... 2003-114514

(51) Int. Cl.
*B60H 1/00* (2006.01)
(52) U.S. Cl. ..................... 165/287; 165/202
(58) Field of Classification Search ............. 165/202, 165/203, 287; 236/49.1, 49.3, 51; 62/178, 62/180, 214, 229; 700/300
See application file for complete search history.

(56) References Cited

U.S. PATENT DOCUMENTS

| 5,145,112 | A | | 9/1992 | Ueda |
| 5,172,856 | A | | 12/1992 | Tanaka et al. |
| 5,187,943 | A | | 2/1993 | Taniguchi et al. |
| 5,291,748 | A | * | 3/1994 | Ueda ........................... 62/179 |
| 6,021,956 | A | | 2/2000 | Haraguchi |
| 6,659,358 | B2 | * | 12/2003 | Kamiya et al. ............. 165/204 |
| 2001/0039806 | A1 | * | 11/2001 | Kawai et al. ................. 62/229 |
| 2004/0065098 | A1 | * | 4/2004 | Choi et al. .................... 62/180 |

FOREIGN PATENT DOCUMENTS

| GB | 2 344 647 A | 6/2000 |
| JP | 10-230729 | 9/1998 |

* cited by examiner

*Primary Examiner*—Ljiljana Ciric
(74) *Attorney, Agent, or Firm*—Kilpatrick Stockton LLP (57) ABSTRACT

The vehicle air-conditioner includes a noncontact detector configured to detect skin temperatures at specific locations on a face of a passenger. The vehicle air-conditioner includes a calculator configured to calculate an average temperature on the face of the passenger. The vehicle air-conditioner includes a decision maker configured to decide whether the skin temperatures are within a deviation from the average temperature. The vehicle air-conditioner includes a controller configured to exclude skin temperatures over the deviation and to respond to skin temperatures within the deviation for controlling air-conditioning.

7 Claims, 7 Drawing Sheets

|  | Fc | Ff |
|---|---|---|
| CONDITION 1 | Y | Y |
| CONDITION 2 | Y | N |
| CONDITION 3 | N | Y |
| CONDITION 4 | N | N |

# VEHICLE AIR-CONDITIONER

CROSS-REFERENCE TO RELATED APPLICATIONS

This application is based upon and claims the benefit of priority from Japanese Patent Application No. 2003-114514 filed on Apr. 18, 2003; the entire contents of which are incorporated herein by reference.

BACKGROUND OF THE INVENTION

The present invention relates to a vehicle air-conditioner which detects temperatures on a passenger to control air-conditioning.

A related vehicle air-conditioner responds to skin temperature data at locations on a face of a passenger, an environment temperature in a vehicle compartment, and temperatures around passenger's head and chest to calculate indices to evaluate a warm or cold, comfort or airflow feeling of a passenger. The vehicle air-conditioner controls air-conditioning in response to the indices (refer to, for example, Japanese Patent Application Laid-Open Publication No. Hei10(1998)-230729).

SUMMARY OF THE INVENTION

The invention provides a vehicle air-conditioner which allows highly accurate air-conditioning. The vehicle air-conditioner detects abnormal skin temperatures at the specific locations on a face to be excluded.

The invention has a first aspect directed to a vehicle air-conditioner. The vehicle air-conditioner includes a non-contact detector configured to detect skin temperatures at specific locations on a face of a passenger. The vehicle air-conditioner includes a calculator configured to calculate an average temperature on the face of the passenger. The vehicle air-conditioner includes a decision maker configured to decide whether the skin temperatures are within a deviation from the average temperature. The vehicle air-conditioner includes a controller configured to exclude skin temperatures over the deviation and to respond to skin temperatures within the deviation for controlling air-conditioning.

The decision maker may decide whether the skin temperatures are detected at glasses locations. The calculator excludes skin temperatures at the glasses locations.

The decision maker may decide whether skin temperatures are detected at beard locations. The calculator excludes skin temperatures at the beard locations.

The calculator may multiply skin temperatures at n-locations on the face of the passenger by weighing coefficients respectively to obtain values. The calculator adds the values to obtain a sum. The calculator divides the sum by the number of n of the locations to obtain the average temperature.

The weighing coefficients may depend on area ratios of measured portions at the n-locations.

The weighing coefficients may depend on priority degree of temperature feeling of the passenger.

The specific locations may include at least one of cheek and forehead.

DETAILED DESCRIPTION OF THE PREFERRED EMBODIMENTS

Figure 1:
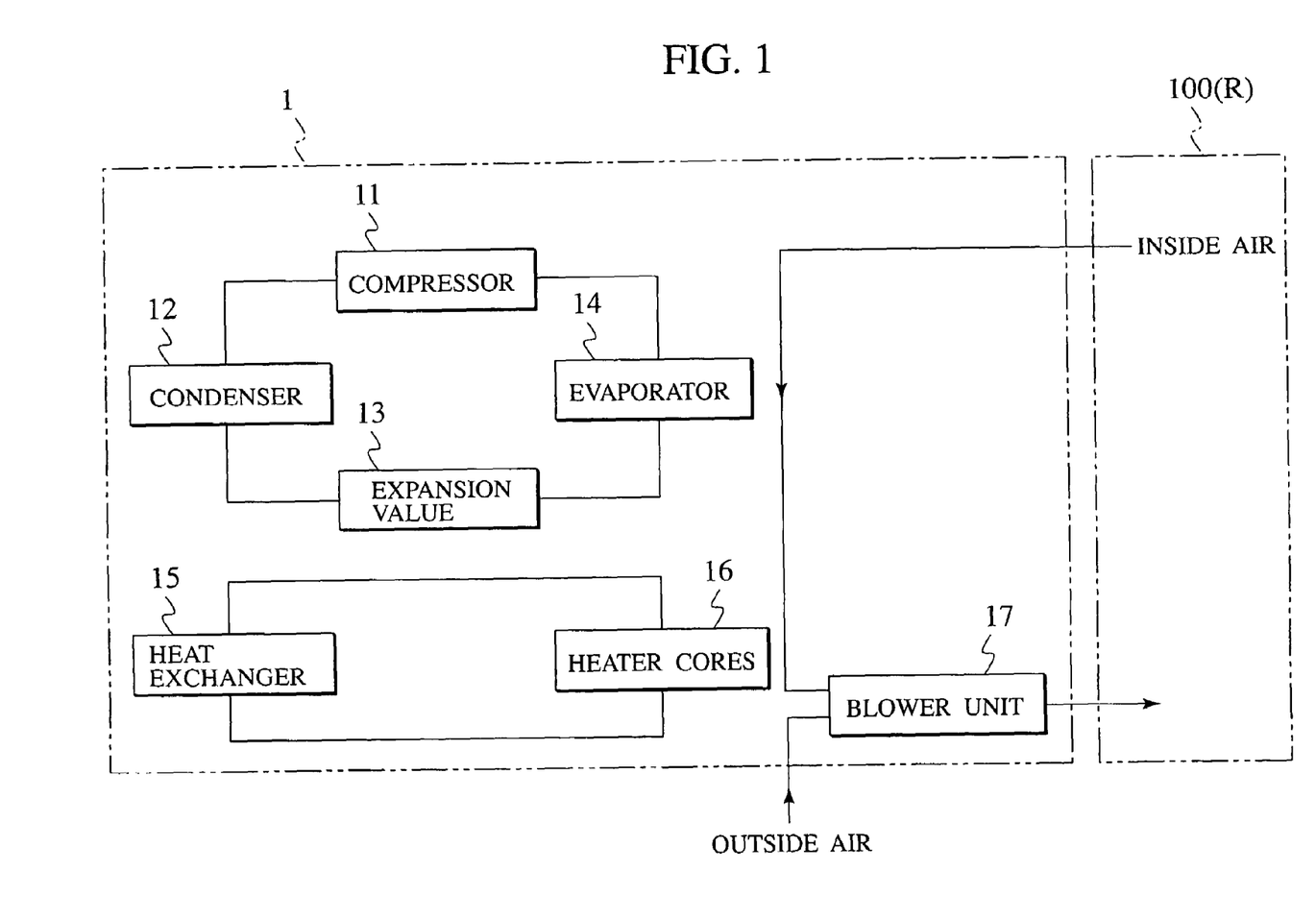
FIG. 1 is a block diagram of a vehicle air-conditioner in accordance with an embodiment of the invention.

Embodiments of the present invention will hereby be described with reference to the drawings. With reference to FIG. 1, a vehicle air-conditioner (referred to as air-conditioner) 1 serves as cooling and heating system. The air-conditioner 1 includes, as a cooling system, a compressor 11, a condenser 12, an expansion valve 13, and an evaporator 14. The air-conditioner 1 includes, as a heating system, a heater core 16, and a heat exchanger located in proximity to an engine. The air-conditioner 1 includes a blower unit 17 connected to pipes in communication with a vehicle compartment 100.

Figure 2:
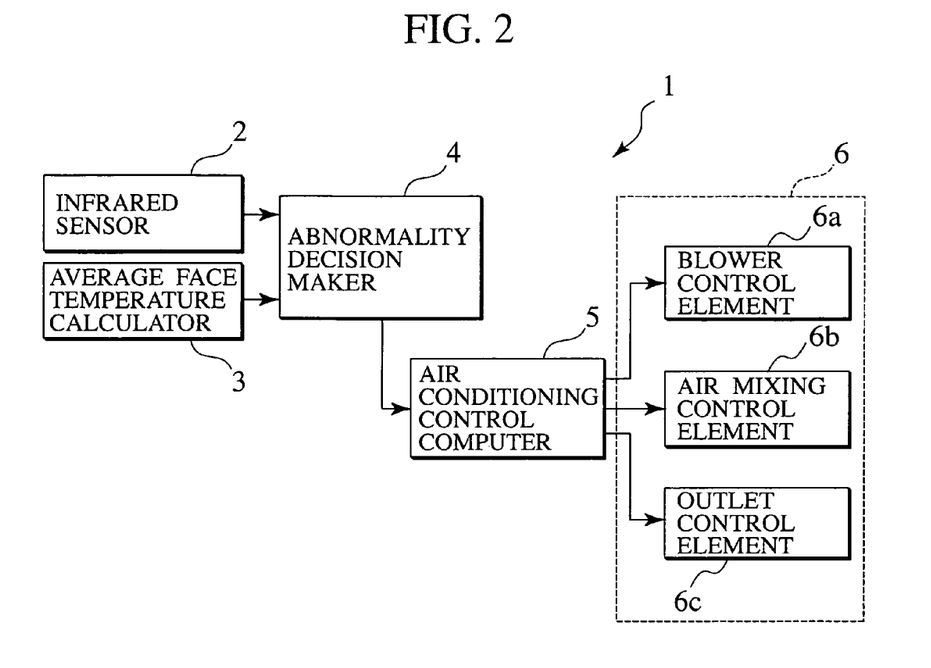
FIG. 2 is a primary block diagram of the vehicle conditioner in FIG. 1.
Figure 3:
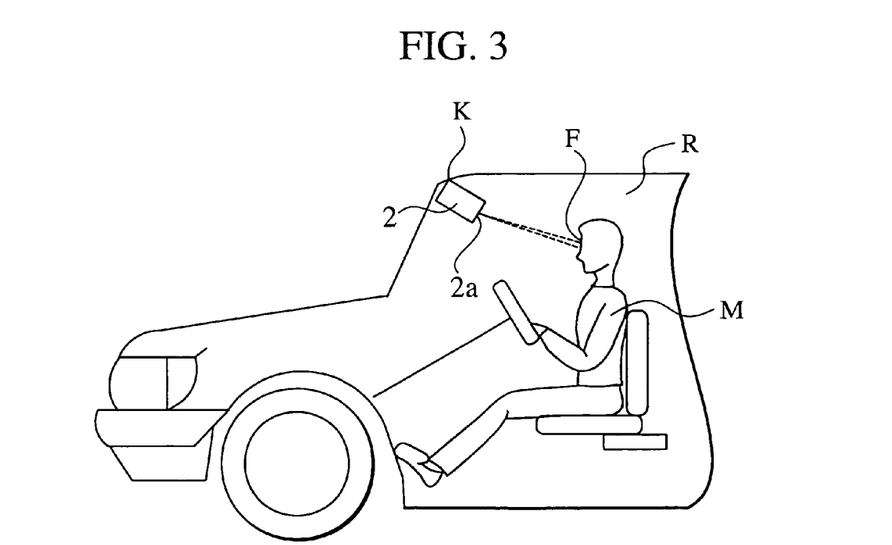
FIG. 3 is a diagram showing a temperature detector equipped in a vehicle compartment.

With reference to FIGS. 2 and 3, the air-conditioner 1 includes an infrared sensor 2 as a noncontact temperature detector, which detects skin temperatures at the specific locations on the face F of a passenger. The air-conditioner 1 includes an average face temperature calculator 3 which calculates an average temperature on the face F of the passenger M. The air-conditioner 1 includes an abnormality decision maker 4, which decides whether or not the skin temperatures at the specific locations, detected by the infrared sensor 2, are abnormal. The air-conditioner 1 includes an air-conditioning control computer 5, to which decision result is inputted and which calculates a control amount of air-conditioning. The air-conditioner 1 includes an air-conditioning controller 6, which responds to calculation result of the air-conditioning control computer 5 to regulate airflow speed, temperature, and outlet.

The air-conditioning controller 6 includes a blower control element 6a which regulates airflow speed. The control element 6a controls the number of motor rotations to regulate amount of air blow from a fan. The air-conditioning controller 6 includes an air mixing control element 6b which controls air-conditioning air in temperature. The control element 6b controls an air mixer to regulate mixing ratio of outside air and cooled air. The controller 6 includes an outlet control element 6c which controls an outlet. The control element 6c controls a louver of the outlet in angle to regulate air-conditioning air to be discharged in direction.

In FIG. 3, the infrared sensor 2 is located at the front K of the ceiling in the vehicle compartment R. The infrared sensor 2 has an infrared radiator 2a directed to the specific locations on the face of passenger M for detecting skin temperatures on the specific locations. In the embodiment, the specific locations to be detected by infrared sensor 2 are set to both cheek and forehead.

The face temperature calculator 3 detects skin temperatures at the respective locations on the face F to calculate an average temperature from the skin temperatures. The detection of skin temperatures at the respective locations on the face F employs a noncontact temperature detector. The noncontact temperature detector employs infrared sensors as well as infrared sensor 2, which measure to establish a thermal picture image, respectively. Instead, an infrared sensor may be used to scan the face F to obtain a thermal picture image.

The abnormality decision maker 4 compares cheek and forehead skin temperatures, measured by infrared sensors 2, with the average temperature calculated by the face temperature calculator 3, thus deciding abnormality or not.

Figure 4:
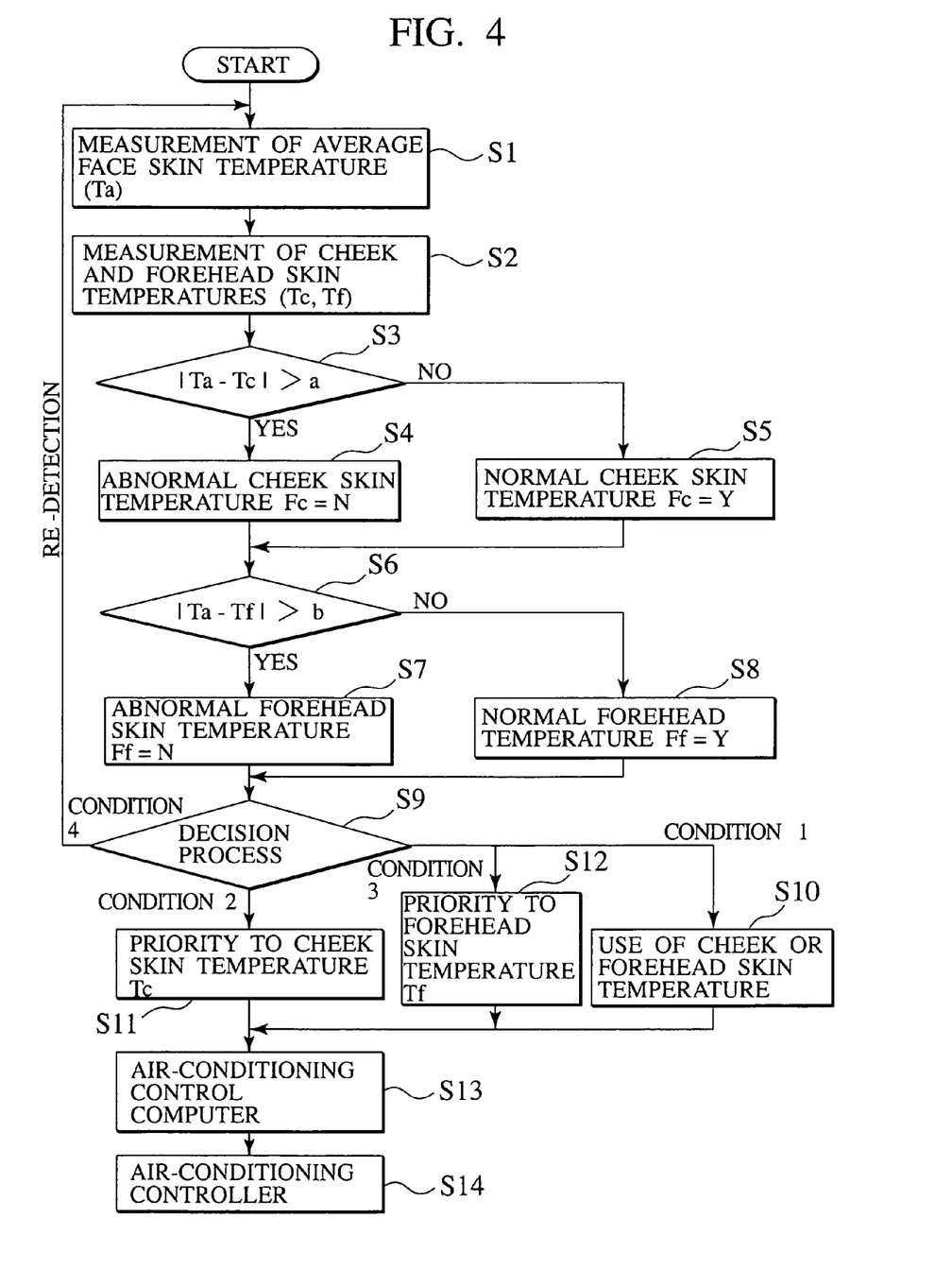
FIG. 4 is a flowchart of air-conditioning control which implements abnormality decision in response to detected skin temperature.

Abnormality decision is described in accordance with the flowchart in FIG. 4.

Firstly, the flowchart goes to the step S1, where the face temperature calculator 3 measures an average skin temperature in the face F. Next, the flowchart goes to the step S2, where the infrared sensor 2 measures cheek and forehead skin temperatures Tc and Tf. The flowchart goes to the step S3, where the abnormality decision maker 4 decides whether or not the absolute value (|Ta−Tc|) of the difference between the average and the cheek skin temperatures is larger than a predetermined permissible value "a".

If the skin temperature difference is larger than the absolute value "a" at the step 3 (Yes), the flowchart goes to the step S4, where cheek decision flag Fc provides "N" as abnormal cheek temperature. If the skin temperature difference is equal to or less than the absolute value a (NO), the flowchart goes to the step S5, where the cheek decision flag Fc provides "Y" as normal cheek skin temperature.

Next, the flowchart goes to the step S6, where the abnormality decision maker 4 decides whether or not the absolute value (|Ta−Tf|) of the difference between the average and forehead skin temperatures is larger than a predetermined permissible value "b". If the skin temperature difference is larger than the absolute value "b" (Yes), the flowchart goes to the step S7 where forehead decision flag Ff provides "N" as abnormal forehead skin temperature. On the other hand, if the skin temperature difference is equal to or less than the absolute value "b" (NO), the flowchart goes to the step S8, where the forehead decision flag Ff provides "Y" as normal forehead skin temperature.

Figure 5:
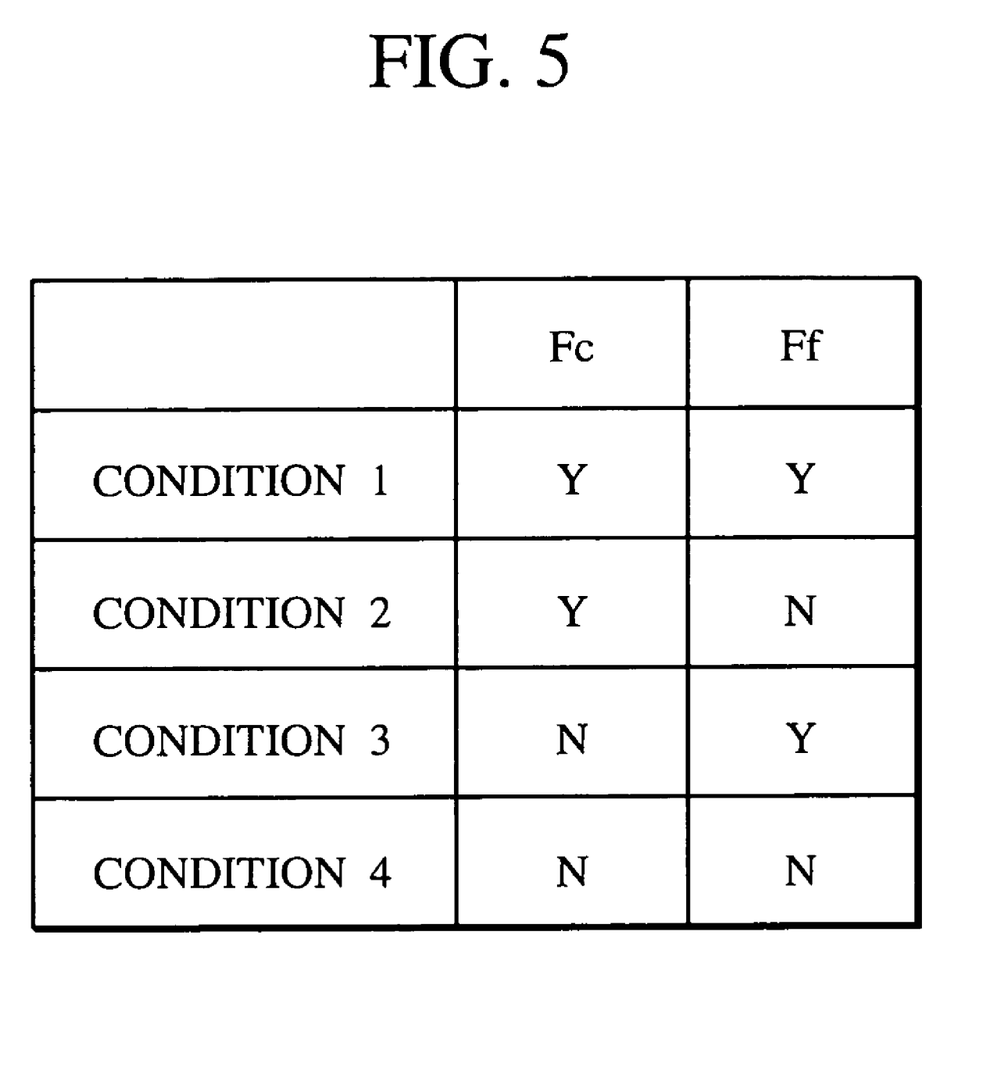
FIG. 5 is a condition table in accordance with cheek decision flag Fc and forehead decision flag Ff.

At the step S9, the cheek decision flag Fc and the forehead decision flag Ff are applied to respective conditions in the map in FIG. 5 so as to decide one of conditions 1 to 4. Under the condition 1 that both flags Fc and Ff provide "Y", the flowchart goes to the step S10, where the cheek or forehead skin temperature Tc or Tf is adopted. Under the condition 2 that the flag Fc provides "Y" and Ff provides "N", the flowchart goes to the step S11, where the cheek skin temperature Tc is given priority, while the forehead skin temperature Tf is excluded.

Under the condition 3 that the flag Fc provides "N" and Ff provides "N", the flowchart goes to the step S12, where the forehead skin temperature Tf is given priority, while the cheek skin temperature Tc is excluded. Under the condition 4 that both flags Fc and Ff provide "N", the forehead and cheek skin temperatures Tc and Tf are excluded so as to go to the step 1 again.

The flowchart goes to either of the step S10, S11 or S12, where a skin temperature is adopted to be output to the air-conditioning control computer 5. The flowchart goes to the step S13, where the air-conditioning control computer 5 calculates air-conditioning controlled variable to be outputted to the air-conditioning controller 6. The flowchart goes to the step S14, where the air-conditioning controller responds to the air-conditioning controlled variable to operate one, two or all of the blower control element 6a, the air mixing control element 6b, and the outlet control element 6c.

According to the above air-conditioner 1, the infrared sensor 2 detects cheek and forehead temperatures Tc and Tf on the face F of passenger M, and the skin temperatures Tc and Tf are employed for air-conditioning control. While, the infrared sensor 2 does not correctly detect a skin temperature at the cheek or forehead, with a mask or a hair applied to the cheek or forehead. In this case, the abnormality decision maker 4 decides abnormality to exclude abnormal skin temperature for air-conditioning control. This prevents air-conditioning control from being deviated by false temperature information from practically required control content of air-conditioning control, thus allowing highly accurate air-conditioning control.

In the embodiment, the specific location for detection of skin temperature on a face F provides a cheek or a forehead. This allows simple and accurate temperature measurement at exposed skin of passenger M for most efficient measurement of skin temperature.

Figure 6:
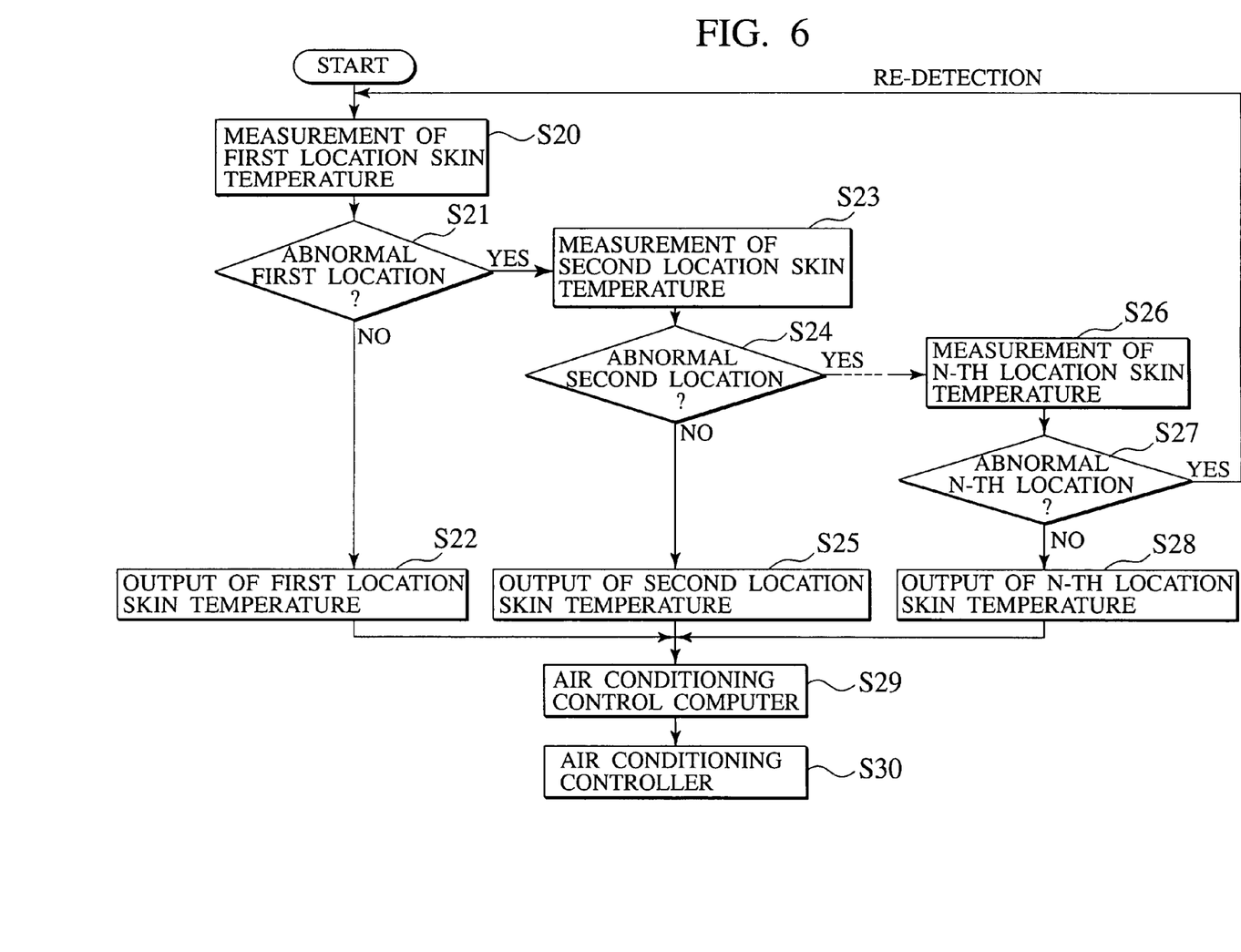
FIG. 6 is a flowchart of air-conditioning control which implements abnormality decision in response to skin temperature detection in accordance with another embodiment.

In the air-conditioner 1, abnormality decision of detected skin temperature is not limited to the flowchart in FIG. 4, but may be implemented in accordance with the flowchart as shown in FIG. 6.

In FIG. 6, the flowchart goes to the step S20, where the infrared sensor 2 measures a skin temperature at the first location on the face F. The flowchart goes to the step S21, where the decision is made whether the first location is abnormal or not. As shown by the steps S1 to S3 in FIG. 4, the decision is made by whether or not the absolute value of difference between an average skin temperature at the face F and a skin temperature at the first location is larger than a predetermined value. The average skin temperature at the face F is measured by the face temperature calculator 3.

The flowchart goes to the step S21. If the decision provides normality (NO), the flowchart goes to the step S22, where the output provides the skin temperature at the first location. While, if the decision provides abnormality (YES) at the step 21, the flowchart goes to the step S23, where the measurement provides a skin temperature at the second location. The flowchart goes to the step S24, where the decision provides whether or not the skin temperature at the second location is abnormal.

Next, the flowchart goes to the step S24. If the decision is normality (NO), the flowchart goes to the step S25, where the output provides the skin temperature at the second location. While, if the decision provides abnormality (Yes) at the step S24, the measurement of skin temperature is applied at the following location. Repeating the processing, the flowchart goes to the step S26, where measurement of skin temperature is finally applied at the N-th location. The flowchart goes to the step S27, where decision provides whether or not the skin temperature at the N-th location is abnormal (Yes).

If decision provides normality (NO) at the step S27, the flowchart goes to the step S28, where the output provides the skin temperature at the N-th location. While, if the decision provides abnormality at the step S27, the flowchart goes to the step S20, where all of the first to the N-th skin temperatures are excluded and the flowchart goes to the step S20 again.

The flowchart goes to either of step S22, S25, S26, S27 or S28, where a skin temperature is outputted to the air-conditioning control computer 5. The flowchart goes to the step S29, where the air-conditioning control computer calculates air-conditioning controlled variable to be outputted to air-conditioning controller 6. The flowchart goes to the step S30, where one, two or all of the blower control element 6a, air mixing element 6b, and outlet control element 6c are operated.

Thus, the air-conditioning control processing in accordance with the flowchart as shown in FIG. 6, excludes abnormal skin temperature at a location on the face F, and adopts a skin temperature at another location. The skin temperature is used to accurate air-conditioning.

According to the air-conditioner 1, the face temperature calculator 3 calculates an average skin temperature on the face F. It is not considered that passenger M does not put on a pair of glasses. Glasses prevent normal skin temperature from being measured, causing error in an average skin temperature of whole face F.

Figure 7:
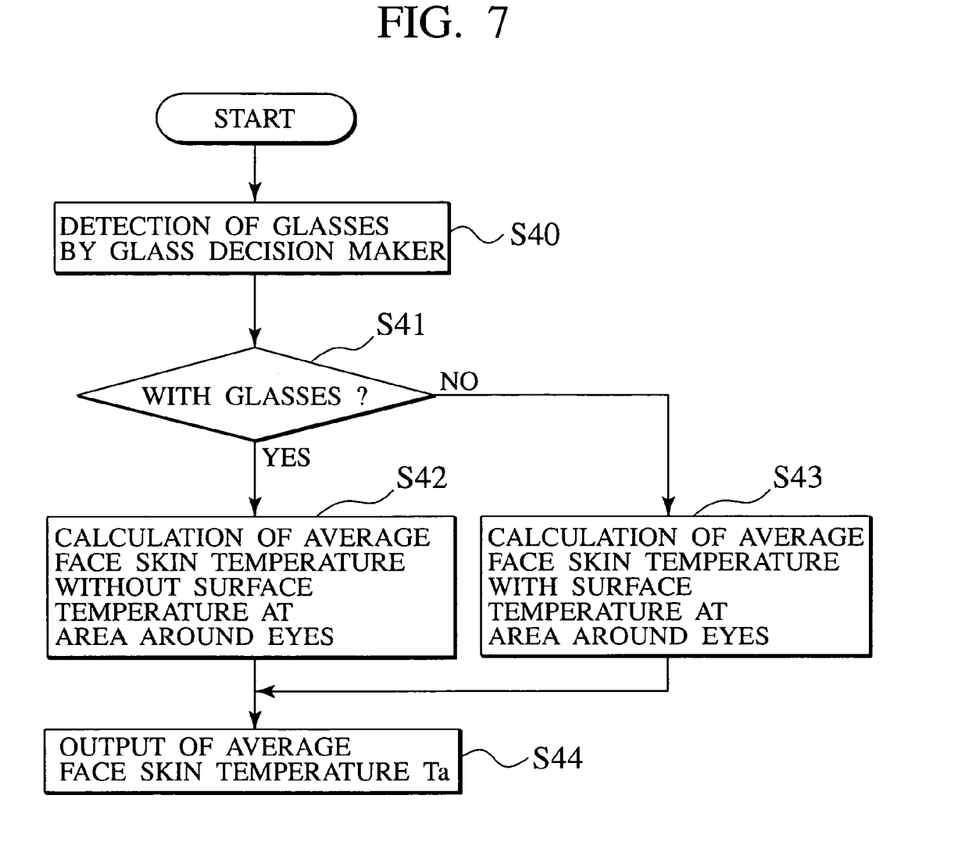
FIG. 7 is a flowchart of air-conditioning control which implements glasses decision in accordance with another embodiment.

The flowchart in FIG. 4 is replaced by the flowchart in FIG. 7. The flowchart detects a normal average face skin temperature in view of the glasses.

In FIG. 7, the flowchart goes to the step S40, where a glasses decision maker detects presence or absence of glasses, and the flowchart goes to the step S41. If the decision provides presence of glasses (YES), the flowchart goes to the step 42, where the face temperature calculator 3 excludes surface temperatures at the area around eyes, and calculates an average skin temperature on the face F.

If the decision provides absence of the glasses (NO) at the step S41, the flowchart goes to the step 43, where the face temperature calculator 3 calculates an average temperature including surface temperatures at the area around the eyes.

The flowchart goes to the step S44, where output provides the average skin temperature Ta on the face F which is calculated at the step S42 or S43.

The glasses decision maker, implementing the step S40, measures respective temperatures using infrared sensors to establish a thermal picture image, as the embodiment does. The glasses decision maker may permit an infrared sensor to scan the face F, establishing a thermal picture image. The glasses decision maker responds to the thermal picture image to decide presence of glasses if temperatures at the specific area around eyes are uniform.

The above embodiment considers a passenger M with glasses. While, if a passenger M has a beard, measurement does not provide normal skin temperature. This causes error to an average face temperature on whole face F. As well as the embodiment, the step S1 of the flowchart in FIG. 4 is replaced by the flowchart in FIG. 8. The detection provides a normal average face skin temperature in view of beard of passenger M.

Figure 8:
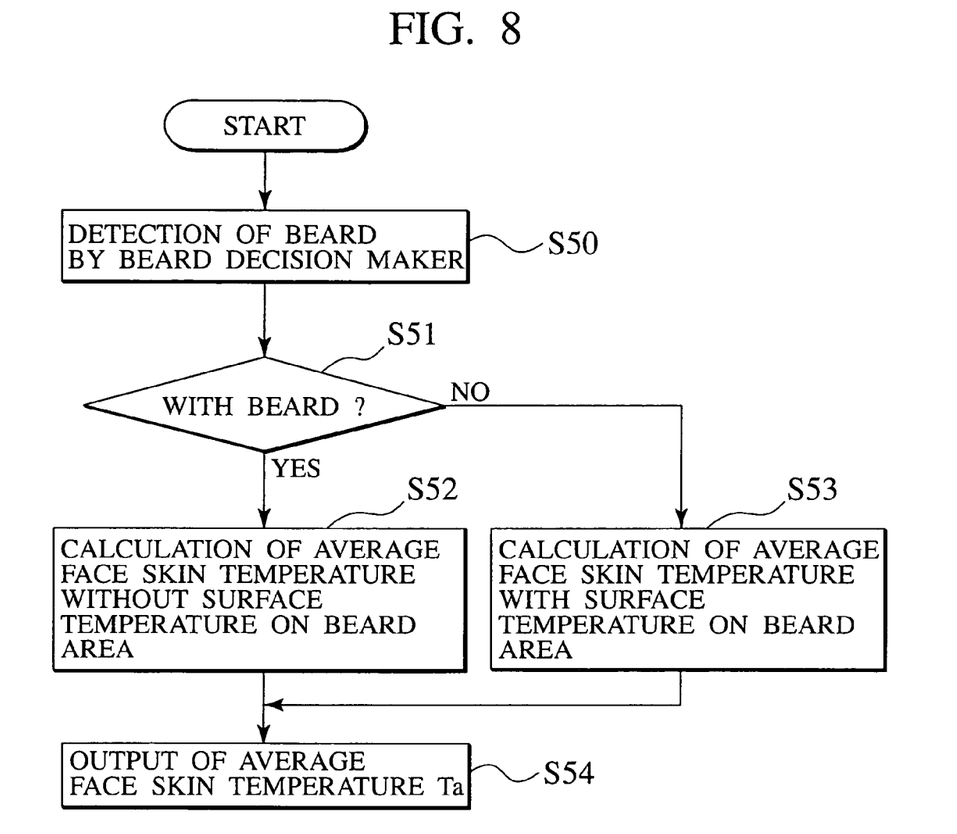
FIG. 8 is a flowchart of air-conditioning control which implements beard decision in accordance with another embodiment.

In FIG. 8, the flowchart goes to the step S50, where a beard decision maker detects presence or absence of beard. The flowchart goes to the step S51. If the decision is presence of beard (YES), the flowchart goes to the step S52, where calculation provides an average skin temperature on the face F, excluding surface temperatures at the area having beard.

If the decision is absence of beard at the step S51, the flowchart goes to the step S53, where calculation provides an average skin temperature on the face F, including surface temperatures at the area to be beard.

The flowchart goes to the step S54, where output provides an average skin temperature Ta, which is calculated at the step S52 or S53.

The beard decision maker, implementing the step S50, measures respective skin temperatures using infrared sensors to establish a thermal picture image, as the above embodiment does. The beard decision maker may permit an infrared sensor to scan the face F, establishing a thermal picture image. The glasses decision maker responds to the thermal picture image to decide presence of glasses if temperatures at the specific area having beard are uniform.

Next, a calculation method of an average face temperature by the face temperature calculator 3 is described. The calculation method employs arithmetic mean or weighting arithmetic mean.

An average skin temperature Ta1 in dependence on arithmetic mean is obtained by division of the simple sum of skin temperatures at n-locations on the face F of a passenger M by the number of n of measurement locations.

$$Ta1=(T1+T2+\ldots Tn)/n$$

Ta1 is an average skin temperature, and T1 to Tn are respective skin temperatures at the measurement locations.

An average skin temperature Ta2 in dependence on weighing arithmetic mean is obtained as follows. Multiplying of skin temperatures at n-locations on the face F of a passenger M by weighing coefficients respectively gives values. Adding of the values gives a sum. Dividing of the sum by the n-number of measurement locations gives Ta2.

$$Ta2=(A1\cdot T1+A2\cdot T2+\ldots An\cdot Tn)/n$$

Ta2 is weighing average skin temperature.

T1 to Tn are skin temperatures at measurement locations.

A1 to An are weighing coefficients.

The weighing coefficients are, for example, area ratios of measurement locations, or constants decided by priority degree based on temperature feeling of passenger M.

When detection provides an average temperature of skin temperatures on face F, the glasses decision or beard decision improves the average temperature in accuracy. This enhances abnormality decision in reliability, establishing accurate air-conditioning control.

An average skin temperature is calculated weighting arithmetic mean in addition to arithmetic mean. This obtains an average skin temperature in accordance with actual face F of a passenger M. Thus, abnormality decision enhances accuracy, establishing highly accurate air-conditioning control.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

According to the invention, the noncontact detector detects skin temperatures at specific locations such as cheek or forehead on a face of a passenger. If the decision maker provides abnormality to skin temperatures at a location such as glasses or beard, the controller excludes abnormal skin temperatures and to respond to normal skin temperatures for controlling air-conditioning. This control prevents air-conditioning control from being deviated by false temperature information from practically required control content of air-conditioning control, thus allowing highly accurate air-conditioning control.

When detection provides an average temperature of skin temperatures on face F, the glasses decision or beard decision improves the average temperature in accuracy. This enhances abnormality decision in reliability, establishing accurate air-conditioning control.

The average skin temperature in view of the weighing coefficients obtains an average skin temperature in accordance with actual face of a passenger. Thus, abnormality decision enhances accuracy, establishing highly accurate air-conditioning control.

What is claimed is:

1. A vehicle air-conditioner comprising:
    a noncontact detector configured to detect skin temperatures at specific locations on a face of a passenger;
    a calculator configured to calculate an average temperature on the face of the passenger;
    a decision maker configured to decide whether the skin temperatures are within a deviation from the average temperature; and
    a controller configured to exclude skin temperatures over the deviation and to respond to skin temperatures within the deviation for controlling air-conditioning.

2. The vehicle air-conditioner of claim 1,
    wherein the decision maker decides whether the skin temperatures are detected at glasses locations,
    wherein the calculator excludes skin temperatures at the glasses locations.

3. The vehicle air-conditioner of claim 1,
    wherein the decision maker decides whether skin temperatures are detected at beard locations,
    wherein the calculator excludes skin temperatures at the beard locations.

4. The vehicle air-conditioner of claim 1,
    wherein the calculator multiplies skin temperatures at n-locations on the face of the passenger by weighing coefficients respectively to obtain values,
    wherein the calculator adds the values to obtain a sum,
    wherein the calculator divides the sum by the number of n of the locations to obtain the average temperature.

5. The vehicle air-conditioner of claim 4,
    wherein the weighing coefficients depend on area ratios of measured portions at the n-locations.

6. The vehicle air-conditioner of claim 4,
    wherein the weighing coefficients depend on priority degree of temperature feeling of the passenger.

7. The vehicle air-conditioner of claim 1,
    wherein the specific locations include at least one of cheek and forehead.

* * * * *